(12) United States Patent
Long et al.

(10) Patent No.: US 9,972,119 B2
(45) Date of Patent: May 15, 2018

(54) VIRTUAL OBJECT HAND-OFF AND MANIPULATION

(71) Applicant: MICROSOFT TECHNOLOGY LICENSING, LLC, Redmond, WA (US)

(72) Inventors: Donna Long, Redmond, WA (US); Matthew Johnson, Kirkland, WA (US); Aaron Mackay Burns, Newcastle, WA (US); Benjamin John Sugden, Redmond, WA (US); Bryant Hawthorne, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 15/234,806

(22) Filed: Aug. 11, 2016

(65) Prior Publication Data

US 2018/0047202 A1 Feb. 15, 2018

(51) Int. Cl.
*G06T 15/00* (2011.01)
*G06F 3/01* (2006.01)
(Continued)

(52) U.S. Cl.
CPC .............. *G06T 15/00* (2013.01); *G06F 3/012* (2013.01); *G06K 9/00671* (2013.01);
(Continued)

(58) Field of Classification Search
CPC ..... G06T 15/00; G06T 11/00; G06K 9/00671; H04N 13/044; H04N 13/0447; G06F 3/012
See application file for complete search history.

(56) References Cited

U.S. PATENT DOCUMENTS 8,576,276 B2 11/2013 Bar-Zeev et al.
8,704,879 B1 4/2014 Cheng et al.
(Continued)

FOREIGN PATENT DOCUMENTS

EP 2624238 A1 8/2013

OTHER PUBLICATIONS

Feiner, et al., "Windows on the World: 2D Windows for 3D Augmented Reality", In Proceedings of the 6th annual ACM symposium on User interface software and technology, Nov. 3, 1993, pp. 145-155.

*Primary Examiner* — Maurice L McDowell, Jr.
(74) *Attorney, Agent, or Firm* — Alleman Hall Creasman & Tuttle LLP

(57) ABSTRACT

A method to display a virtual object includes receiving virtual-object data representing a virtual object, a first rendering of the virtual object being displayed on a display screen during a first interval. The method also includes receiving display-screen data indicating a physical size, position, and orientation of the display screen, and receiving display-device data indicating a position and orientation of a near-eye display device. The method includes composing a second, 3D rendering of the virtual object based on the virtual-object data and on the relative position and orientation of the display screen versus the near-eye display device, as indicated by the display-screen and display-device data, and, displaying the second rendering binocularly on the near-eye display device during a subsequent second interval, such that the second rendering coincides with the first rendering in an augmented field of view of the user.

20 Claims, 11 Drawing Sheets

(51) Int. Cl.
*H04N 13/04* (2006.01)
*G06T 11/00* (2006.01)
*G06K 9/00* (2006.01)

(52) U.S. Cl.
CPC ........... *G06T 11/00* (2013.01); *H04N 13/044* (2013.01); *H04N 13/0447* (2013.01)

(56) References Cited

U.S. PATENT DOCUMENTS

| | | |
|---|---|---|
| 9,323,055 B2 | 4/2016 | Baillot |
| 2009/0228841 A1 | 9/2009 | Hildreth |
| 2009/0322671 A1 | 12/2009 | Scott et al. |
| 2011/0012896 A1 | 1/2011 | Ji |
| 2012/0092328 A1 | 4/2012 | Flaks et al. |
| 2013/0141421 A1 | 6/2013 | Mount et al. |
| 2013/0154913 A1 | 6/2013 | Genc et al. |
| 2013/0318479 A1 | 11/2013 | Porwal |
| 2014/0002442 A1 | 1/2014 | Lamb et al. |
| 2015/0049018 A1 | 2/2015 | Gomez |
| 2016/0027214 A1 | 1/2016 | Memmott et al. | ns
VIRTUAL OBJECT HAND-OFF AND MANIPULATION

BACKGROUND

There is great interest today in technologies that support 'virtual reality' (VR), including display and manipulation of virtual objects. Recent advances in VR have been driven in part by the emergence of low-cost, stereoscopic near-eye display devices and machine-vision systems. Once limited to high-end gaming, VR is now making significant inroads in other areas, such as engineering design and productivity. An ongoing goal in VR research and development is to continue to improve display, tracking, and manipulation modalities, so that virtual objects take on a real-life quality in terms of appearance and manner of manipulation.

SUMMARY

One embodiment is directed to a method to display a virtual object. The method includes receiving virtual-object data representing a virtual object, where a first rendering of the virtual object is displayed on a display screen during a first interval. The method also includes receiving display-screen data indicating a physical size, position, and orientation of the display screen, and receiving display-device data indicating a position and orientation of a near-eye display device. The method includes composing a second, 3D rendering of the virtual object based on the virtual-object data and on the relative position and orientation of the display screen versus the near-eye display device, as indicated by the display-screen and display-device data, and, displaying the second rendering binocularly on the near-eye display device during a subsequent second interval, such that the second rendering coincides with the first rendering in an augmented field of view of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
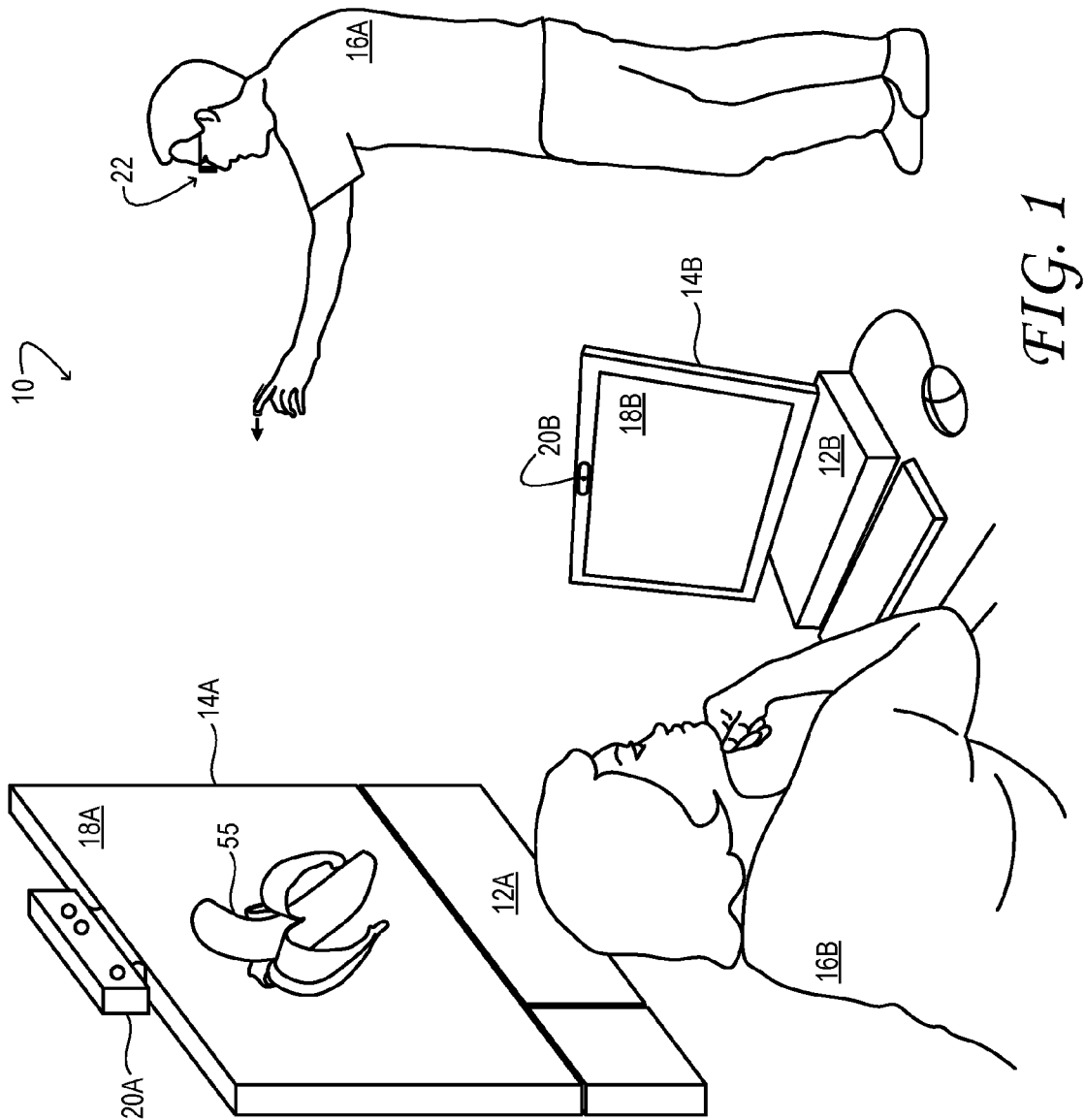
FIGS. 1 and 2 show aspects of an example computer system.

Aspects of this disclosure will now be described by example and with reference to the drawing figures listed above. Components, process steps, and other elements that may be substantially the same in one or more embodiments are identified coordinately and described with minimal repetition. It will be noted, however, that elements identified coordinately may also differ to some degree. It will be further noted that the drawing figures are schematic and generally not drawn to scale. Rather, the various drawing scales, aspect ratios, and numbers of components shown in the figures may be purposely distorted to make certain features or relationships easier to see.

One of the challenges of virtual reality (VR) is to give virtual objects the same character as real objects. Qualities such as persistence and transferability are especially important. For instance, a virtual object should be transferable naturally from one environment to another, not tied to the environment on which it was originally created or encountered. If multiple users are intended to experience the same virtual object, then that object should be transferable from the public environment that all the users share to one or more private environments where access to the object may be limited. The disclosure herein sets forth a framework for transfer, or movement, of virtual objects among a plurality of platforms and environments, and among different users.

FIG. 1 shows aspects of an example computer system 10 of networked computers and peripheral devices. The computer system includes a plurality of workstation or desktop computers 12 (12A, 12B, etc.), each computer operatively coupled to an associated display screen 14 (14A, 14B, etc.) and to traditional input componentry accessible to one or more users 16 (16A, 16B, etc.). Each display screen presents a display surface 18 (18A, 18B, etc.), which may be flat or curved. The traditional input componentry includes a keyboard and mouse in the illustrated example. In other examples, the keyboard or mouse may be optional, as the display screen may be a touch screen and/or input may be provided by other modalities, such as natural-user-input gestures or voice commands. In some embodiments, the computer and display screen may be integrated in the form of a laptop or tablet computer. In some embodiments, the display screen is formed on a passive surface by projection of a display image thereon.

As shown in FIG. 1, a machine-vision system 20 (20A, 20B, etc.) may be operatively coupled to the one or more computers 12 and arranged so as to acquire video of users 16. To this end, the machine-vision system may include one or more depth cameras and/or color cameras. By analysis of the video from the machine-vision system, hand or body gestures of a user may be identified and used as a form of input. In some embodiments, any computer 12 may be a server computer associated with plural display screens, keyboards, machine-vision systems, etc. Computer system 10 also includes at least one stereoscopic, near-eye display device 22 that may be worn and used by the users. The near-eye display device is described further below.

Figure 2:
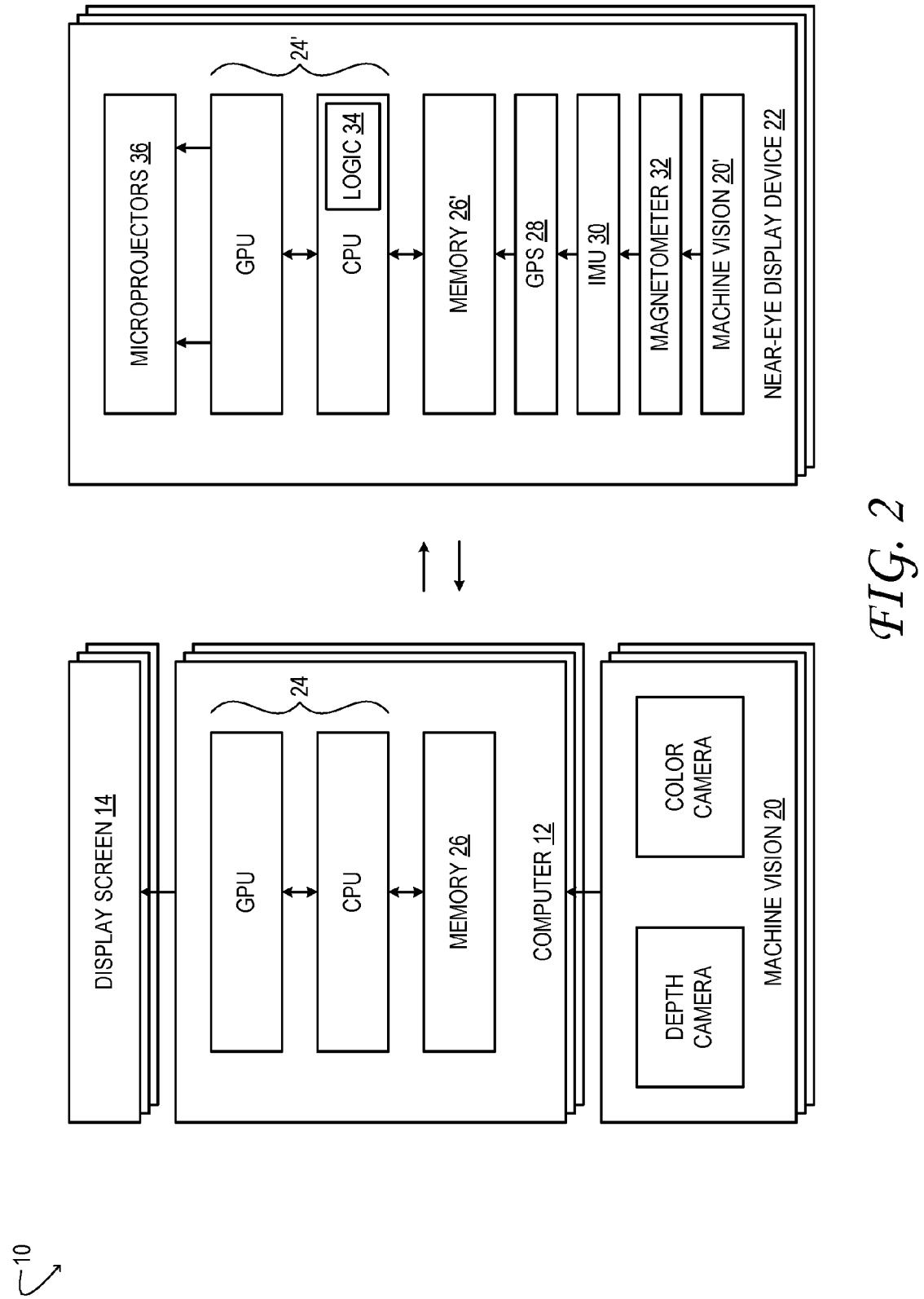

FIG. 2 shows, schematically, additional aspects of computer system 10 in one, non-limiting embodiment. Each computer 12 includes at least one processor 24 and associated electronic memory machine 26. The electronic memory machine holds instructions that cause the processor to enact the methods described further below. In some embodiments, the processor may comprise one or more of a central processing unit (CPU) and a graphics processing unit (GPU). Like computers 12, each near-eye display device 22 includes at least one processor 24' and associated electronic memory machine 26', the electronic memory machine holding instructions that cause the processor to enact the methods described further below.

Near-eye display device 22 includes a global positioning-system (GPS) receiver 28, an inertial measurement unit (IMU) 30, and a magnetometer 32. The IMU itself may comprise a multi-axis accelerometer and a multi-axis gyroscope for detailed translation and rotation detection. The magnetometer may be configured to sense the absolute orientation of the near eye display device. Each near-eye display device may also include a machine-vision system 20' in the form of one or more forward-facing cameras. Downstream image-processing logic 34 of the near-eye display device may be configured to recognize real objects imaged by the machine-vision system.

The computers, near-eye display and peripheral devices of computer system 10 may be networked (i.e., communicatively coupled via a wired or wireless network).

Figure 3:
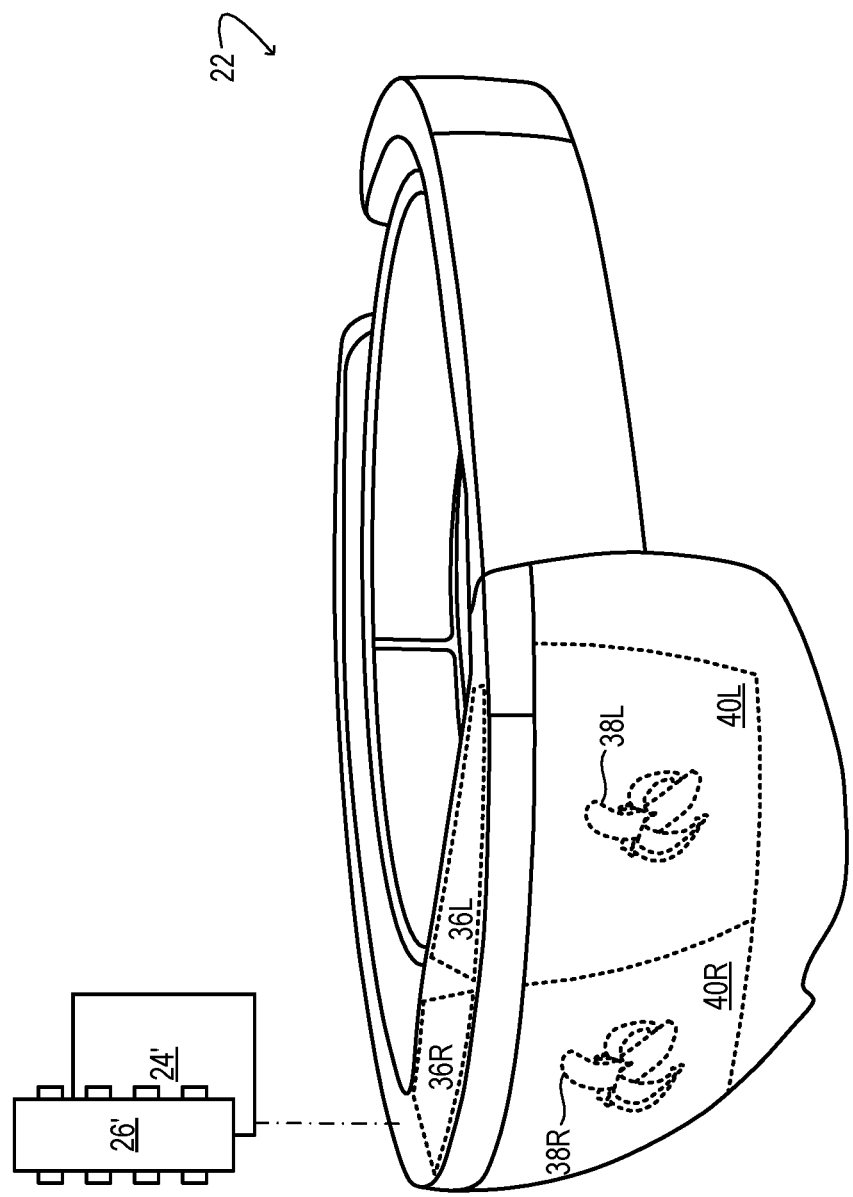
FIG. 3 shows aspects of an example near-eye display device.

FIG. 3 shows aspects of a near-eye display device 22 in one, non-limiting embodiment. The near-eye display device includes a right microprojector 36R configured to project a right display image 38R and a left microprojector 36L configured to project a left display image 38L. Viewed binocularly by a user of the near-eye display device, the right and left display images are fusible in the user's visual cortex to effect stereoscopic, 3D image display. Although separate right and left microprojectors are shown in FIG. 3, a single microprojector, alternatively, may be used to form the right and left display images.

Near-eye display device 22 includes a right display window 40R and a left display window 40L. In some embodiments, the right and left display windows 20 are at least partially transparent from the perspective of the user, to give the user a clear view of his or her surroundings. This feature enables virtual display imagery to be admixed with real imagery from the surroundings, for an illusion of 'augmented' or 'mixed' reality. In other embodiments, the display windows are opaque, so as to provide a fully immersive VR experience.

In some embodiments, display imagery is received in real time from an external network via processor 24', and conveyed to microprojectors 36. The display imagery may be transmitted in any suitable form—viz., type of transmission signal and data structure. The signal encoding the display imagery may be carried over a wired or wireless communication link to the processor. In other embodiments, at least some display-image composition and processing may be enacted from within the processor itself.

When near-eye display device 22 is in use, processor 24' sends appropriate control signals to right microprojector 36R that cause the right microprojector to form right display image 38R in right display window 40R. Likewise, the processor sends appropriate control signals to left microprojector 36L that cause the left microprojector to form left display image 38L in left display window 40L. The display-device user views the right and left display images through right and left eyes, respectively. When the right and left display images are composed and presented in an appropriate manner (vide infra), the user experiences the illusion of one or more virtual objects at specified positions, having specified 3D content and other display properties. A plurality of virtual objects of any desired complexity may be displayed concurrently in this manner, so as to present a complete virtual scene having foreground and background portions.

Figure 4:
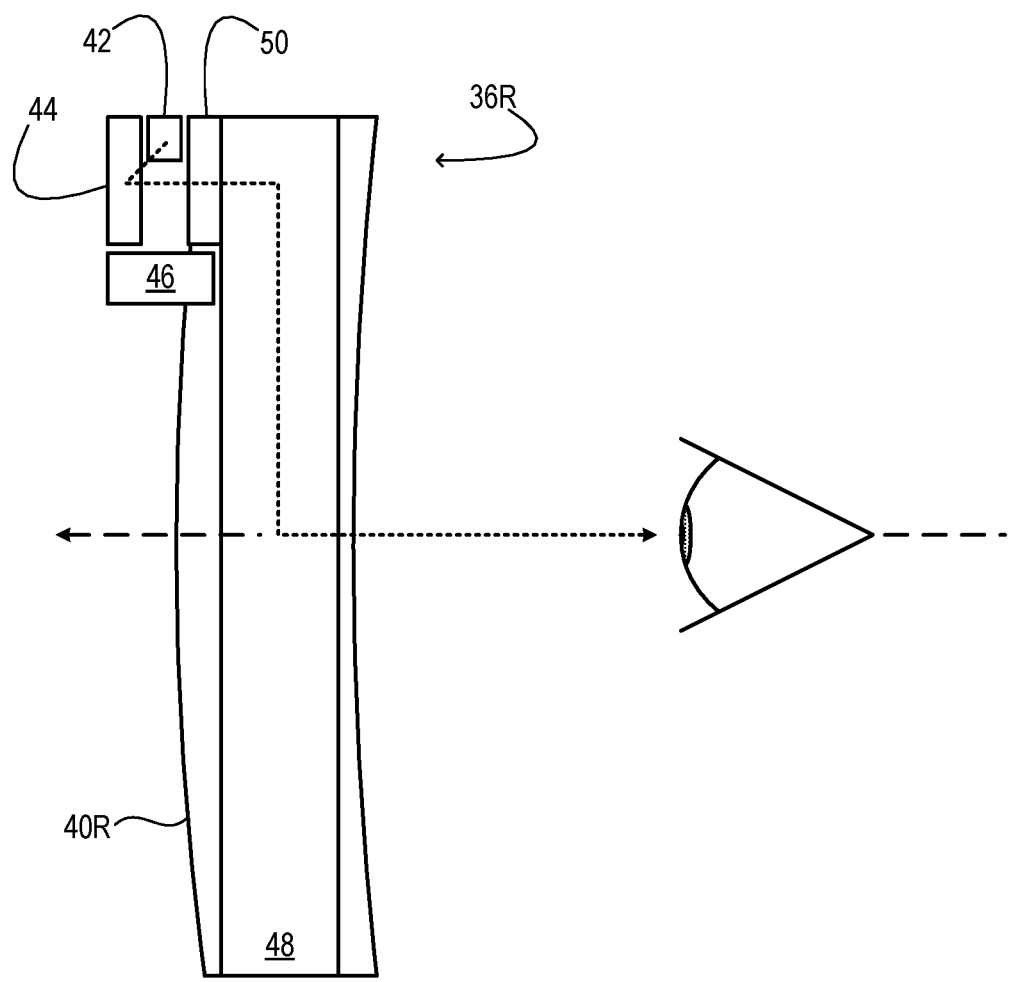
FIG. 4 shows aspects of an example microprojector, forward-facing camera, and display window of a near-eye display device.

FIG. 4 shows aspects of right microprojector 36R and the associated display window 40R in one, non-limiting embodiment. The microprojector includes a light source 42 and a liquid-crystal-on-silicon (LCOS) array 44. The light source may comprise an ensemble of light-emitting diodes (LEDs)—e.g., white LEDs or a distribution of red, green, and blue LEDs. The light source may be situated to direct its emission onto the LCOS array, which is configured to form a display image based on the control signals from processor 24'. The LCOS array may include numerous, individually addressable pixels arranged on a rectangular grid or other geometry. In some embodiments, pixels reflecting red light may be juxtaposed in the array to pixels reflecting green and blue light, so that the LCOS array forms a color image. In other embodiments, a digital micro mirror array may be used in lieu of the LCOS array, or an active-matrix LED array may be used instead. In still other embodiments, transmissive, backlit LCD or scanned-beam technology may be used to form the display image. FIG. 4 also shows forward-facing camera 46 of machine vision system 20' of the near-eye display device.

In some embodiments, the display image from LCOS array 44 may not be suitable for direct viewing by the user of near-eye display device 22. In particular, the display image may be offset from the user's eye, may have an undesirable vergence, and/or a very small exit pupil (i.e., area of release of display light, not to be confused with the user's anatomical pupil). In view of these issues, the display image from the LCOS array may be further conditioned en route to the user's eye, as described below.

In the embodiment of FIG. 4, the display image from LCOS array 44 is received into a vertical pupil expander 48. The vertical pupil expander lowers the display image into the user's field of view, and in doing so, expands the exit pupil of the display image in the 'vertical' direction. In this context, the vertical direction is the direction orthogonal to the user's interocular axis and to the direction that the user is facing. From vertical pupil expander 48, the right display image is received into a horizontal pupil expander, which may be coupled into or embodied as right display window 40R. In other embodiments, the horizontal pupil expander may be distinct from the right display window. The horizontal pupil expander expands the exit pupil of the display image in the 'horizontal' direction. The horizontal direction, in this context, is the direction parallel to the interocular axis of the user of near-eye display device 22—i.e., the direction in and out of the page in FIG. 4. By passing through the horizontal and vertical pupil expanders, the display image is presented over an area that covers the eye. This enables the user to see the display image over a suitable range of horizontal and vertical offsets between the microprojector and the eye. In practice, this range of offsets may reflect factors such as variability in anatomical eye position among users, manufacturing tolerance and material flexibility in near-eye display device 22, and imprecise positioning of the near-eye display device on the user's head.

In some embodiments, right microprojector 36R may apply optical power to the display image from LCOS array 44, in order to modify the vergence of the display image. Such optical power may be provided by the vertical and/or horizontal pupil expanders, or by lens 50, which couples the display image from the LCOS array into the vertical pupil expander. If light rays emerge convergent or divergent from the LCOS array, for example, the microprojector may reverse the image vergence so that the light rays are received collimated into the user's eye. This tactic can be used to form a display image of a far-away virtual object. Alternatively, the microprojector may be configured to impart a fixed or adjustable divergence to the display image, consistent with a virtual object positioned a finite distance in front of the user. Naturally, the foregoing description of right microprojector 36R and right display window 40R applies equally to left microprojector 36L and left display window 40L.

Figure 5:
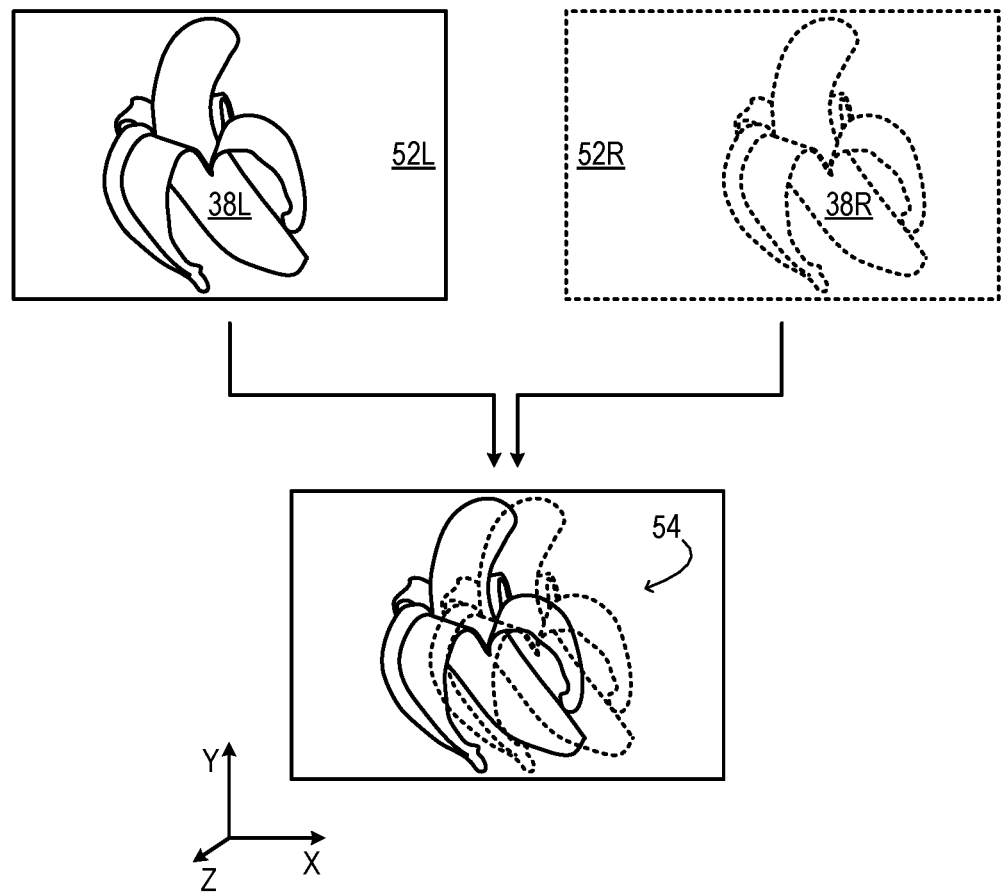
FIGS. 5 and 6 illustrate, by way of example, stereoscopic display of a virtual object.

Continuing, a user's perception of distance to a given locus of a virtual object is affected not only by display-image vergence but also by positional disparity between the right and left display images. This principle is illustrated by way of example in FIGS. 5 and 6. FIG. 5 shows right and left image frames 52R and 52L, overlaid upon each other for purposes of illustration. The right and left image frames correspond to the image-forming areas of LCOS arrays 44 of right and left microprojectors 36R and 36L. As such, the right image frame encloses right display image 38R, and the left image frame encloses left display image 38L. Rendered appropriately, the right and left display images may appear to the user as a 3D virtual object 54 of any desired complexity. In the example of FIG. 5, the virtual object includes a surface contour having a depth coordinate Z associated with each pixel position (X, Y) of the right and left image frames. The desired depth coordinate may be simulated in the following manner, with reference now to FIG. 6.

Right and left microprojectors 36 may be configured to project each locus P of right and left display images 38 onto focal a plane F located a fixed distance $Z_0$ from the interpupilary axis (IPA) of the user. $Z_0$ is a function of the vergence applied by the microprojectors. In one embodiment, $Z_0$ may be set to 'infinity', so that each microprojector presents a display image in the form of collimated light rays. In another embodiment, $Z_0$ may be set to two meters, requiring each microprojector to present the display image in the form of diverging rays. In some embodiments, $Z_0$ may be chosen at design time and remain unchanged for all virtual objects rendered by near-eye display device 22. In other embodiments, each microprojector may be configured with electronically adjustable optical power, allowing $Z_0$ to vary dynamically according to the range of distances over which virtual object 54 is to be presented.

Figure 6:
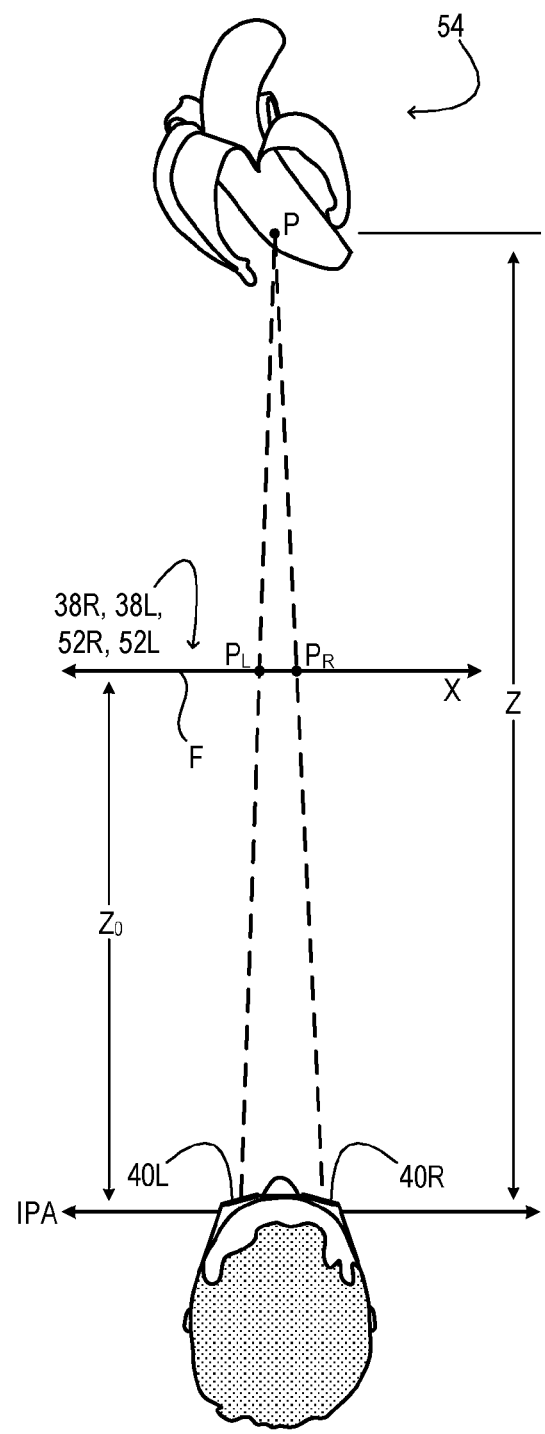

Once the distance $Z_0$ to focal plane F has been established, the depth coordinate Z for every surface point P of virtual object 54 may be set. This is done by adjusting the positional disparity of the two loci corresponding to point P in the right and left display images. In FIG. 6, the locus corresponding to point P in the right image frame is denoted $P_R$, and the corresponding locus in the left image frame is denoted $P_L$. In FIG. 6, the positional disparity is positive—i.e., $P_R$ is to the right of $P_L$ in the overlaid image frames. This causes point P to appear behind focal plane F. If the positional disparity were negative, P would appear in front of the focal plane. Finally, if the right and left display images were superposed (no disparity, $P_R$ and $P_L$ coincident) then P would appear to lie directly on the focal plane. Without tying this disclosure to any particular theory, the positional disparity D may be related to Z, $Z_0$, and to the interpupillary distance (IPD) by $$D = IPD \times \left(1 - \frac{Z_0}{Z}\right).$$

In the approach described above, the positional disparity sought to be introduced between corresponding loci of the right and left display images 38 is parallel to the interpupilary axis of the user of near-eye display device 22. Here and elsewhere, positional disparity in this direction is called 'horizontal disparity,' irrespective of the orientation of the user's eyes or head. Based on an estimate of the user's pupil positions, the processor of the near-eye display device may be configured to shift and scale the display images by an appropriate amount to cancel any vertical component of the positional disparity, and to ensure that the remaining horizontal disparity is of an amount to place the rendered virtual object at the specified distance in front of the user.

The approach outlined above admits of many variants and equally many algorithms to enact the required shifting and scaling. In one embodiment, processor 24' maintains a model of the Cartesian space in front of the user in a frame of reference fixed to near-eye display device 22. The user's pupil positions (assumed, estimated, or determined by optional eye-imaging cameras) are mapped onto this space, as are the superimposed image frames 52R and 52L, positioned at the predetermined depth $Z_0$. (The reader is again directed to FIGS. 5 and 6.) Then, a virtual object 54 is constructed, with each point P on a viewable surface of the object having coordinates X, Y, and Z, in the frame of reference of the display system. For each point on the viewable surface, two line segments are constructed—a first line segment to the pupil position of the user's right eye and a second line segment to the pupil position of the user's left eye. The locus $P_R$ of the right display image, which corresponds to point P, is the intersection of the first line segment in right image frame 52R. Likewise, the locus $P_L$ of the left display image is the intersection of the second line segment in left image frame 52L. This procedure automatically provides the appropriate amount of shifting and scaling to eliminate any vertical disparity and to create the right amount of horizontal disparity to correctly render the viewable surface of the virtual object, placing every point P at the required distance from the user. In some embodiments, the required shifting and scaling may be done in the frame buffers of one or more graphics-processing units (GPUs) of processor 24', which accumulate the right and left display images. In other embodiments, electronically adjustable optics in microprojectors 36 may be used to shift and/or scale the display images by the appropriate amount.

Returning now to FIG. 1, with the configurations and methods disclosed herein, each user 16 of computer system 10 is able to experience the same virtual object (e.g., virtual object 54 from FIG. 6), a first rendering 55 of which is shown displayed on display screen 14A. User 16A is able to sight the virtual object on display screen 14A, move the virtual object off of the plane (or other display surface 18) of the display screen, rotate, resize, or otherwise change the virtual object, and then place the changed virtual object back onto display screen 14A, or onto another display screen, for the same or other users to experience. These operations are described in greater detail with reference to the methods and additional description below.

Figure 7:
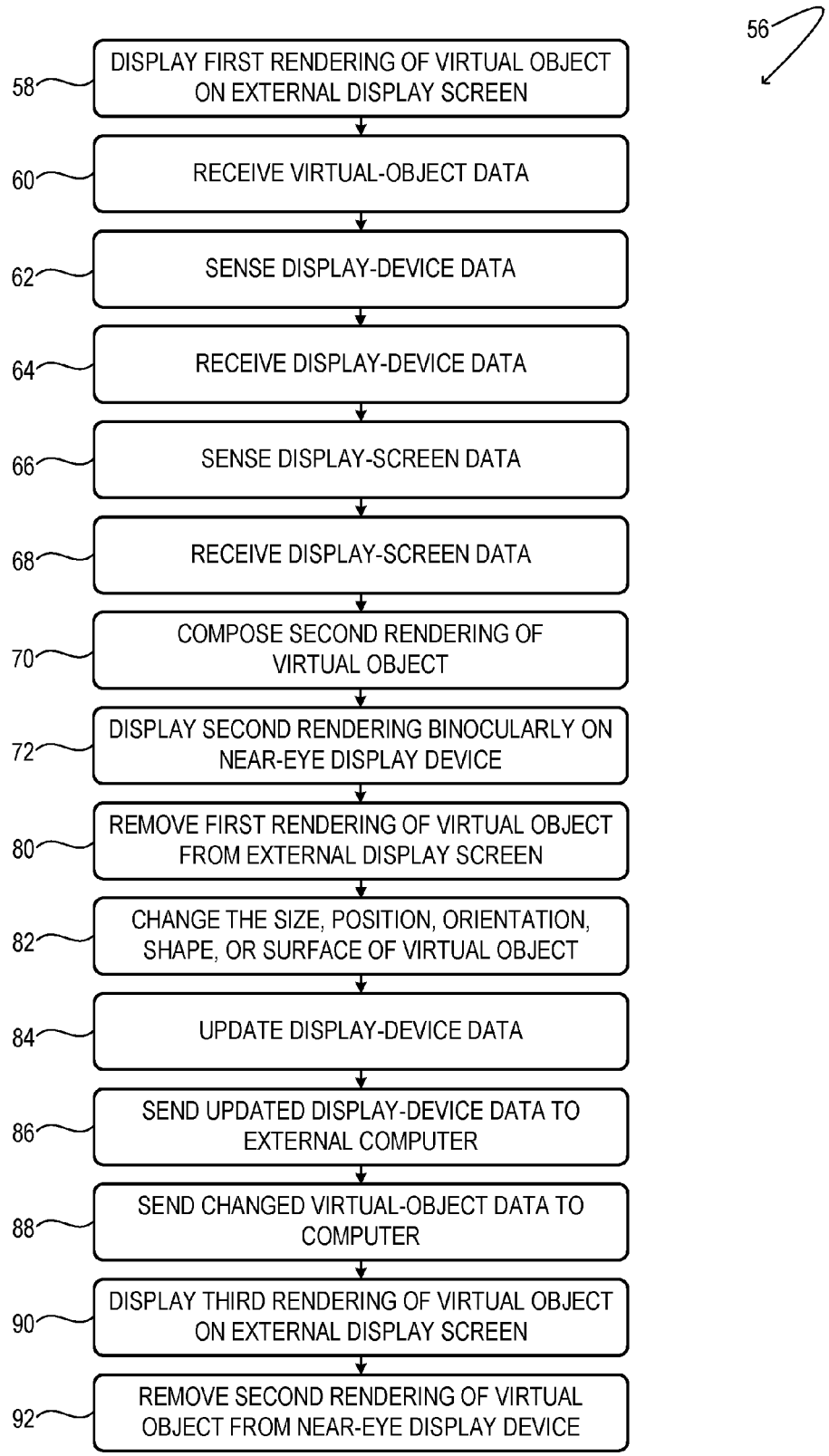
FIG. 7 illustrates an example method to display a virtual object.

FIG. 7 illustrates an example method 56 to display a virtual object. The method may be enacted in a computer system including at least one stereoscopic, near-eye display device and at least one external display screen viewable to a user of the near-eye display device. Accordingly, method 56 will be described with reference to computer system 10, described above. The reader will note, however, that the method is equally applicable to various other computer systems.

At 58 of method 56, a first rendering of a virtual object is displayed on a display screen during a first interval—e.g., time interval, number of image frames, etc. The first rendering may be composed by a processor (a GPU, for example) of a computer operatively coupled to the display screen. In this context, the display screen and computer are external to the one or more near-eye display devices of the computer system. The rendering is dictated by virtual-object data representing the virtual object. The virtual-object data may include an array of ordered triplets $(X_i, Y_i, Z_i)$ representing the Cartesian coordinates of each of a plurality of points i on the virtual object. The virtual object data may include a connectivity matrix defining which points are connected, and/or the manner of connection. The virtual object data may define closed surfaces joining the connected points, surface elements, tessellations, and surface properties such as color and texture. Such data may be stored in an electronic memory machine of the computer and/or accessed by the computer over a network. In some examples, the first rendering may be a 2D projection of the virtual object onto a plane or other display surface of the external display screen. At 60 a near-eye display device of the computer system receives the virtual-object data representing the virtual object. The virtual object data may be received from the computer operatively coupled to the external display screen (e.g., via wireless communication), or from any computer networked thereto.

At 62 display-device data indicating a position and orientation of the near-eye display device is sensed. In one embodiment, the display-device data may be sensed by one or more sensory components arranged in the near-eye display device itself—by a GPS, IMU, and/or magnetometer, for example. In another embodiment, the display-device data may be sensed by a machine-vision system coupled to an external computer of the computer system—e.g., the computer associated with the display screen displaying the first rendering, or of any computer networked thereto. The display-device data may include a 3D position and 3D orientation of the near-eye display device, each referenced to world space, specifying each of the six degrees of freedom that an asymmetric object may have. At 64 a processor of the near-eye display device (a GPU, for example) receives display-device data that was sensed.

At 66 display-screen data indicating a physical size, position, and orientation of the external display screen displaying the first rendering is sensed. The display-screen data may include a representation of display-screen coordinates in 3D world space. In one particular example, the display-screen data may include coordinates (X, Y, Z) of three of the four corners of a flat display screen. In examples in which the display surface is curved, the display-screen data may also encode the radius of curvature of the display surface about one or more axes. In some embodiments, the display-screen data may be sensed by a machine-vision system of the afore-mentioned near-eye display device. Downstream image-processing logic of the near-eye display device may apply object recognition to an image of the display screen acquired by the machine-vision system. The object recognition may be used to recognize the external display screen as such, as well as determine the size, position, and orientation of the display screen or of the active display surface thereof. Additional modes of sensing the display-screen data are described hereinafter. At 68 the afore-mentioned processor of the near-eye display system receives the display-screen data that was sensed.

At 70 the processor of the near-eye display device composes a second, 3D rendering of the virtual object based on the virtual-object data received and on the relative position and orientation of the display screen versus the near-eye display device, as indicated by the display-screen and display-device data received. The second rendering may be a 3D rendering that includes binocular disparity to provide an illusion of depth. At 72 the near-eye display device displays the second rendering binocularly during a second interval, which is subsequent to the first interval noted above. The second rendering may be displayed so as to coincide with the first rendering in the augmented field of view of the user. 'Coincidence' of the first and second renderings may be interpreted in accordance with the following.

Figure 8:
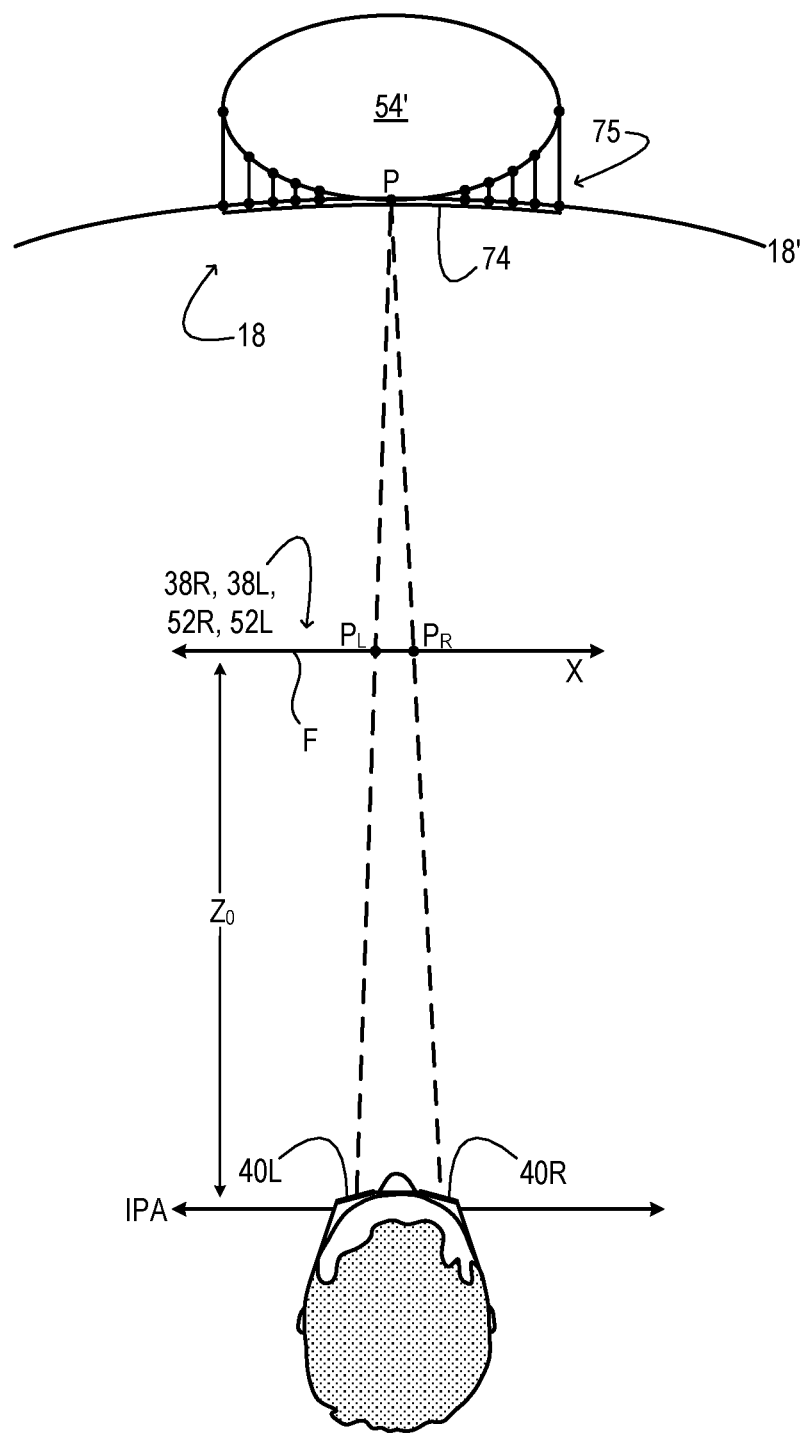
FIG. 8 illustrates, by way of example, coincidence of first and second renderings of a virtual object.

With reference now to FIG. 8, the second rendering of virtual object 54' (illustrated as an elliptical shape for the sake of simplicity) creates a virtual right display image 38R in the visual field of the user's right pupil and a virtual left display image 38L in the visual field of the user's left pupil. The first rendering creates a real display image 74 in the visual fields of both pupils. Coincidence of the first and second renderings requires, for each of the virtual right and left display images and the associated right or left pupil of the user, that each point on the virtual image and the corresponding point on the real image both lie on or near a line that passes through the pupil. Strictly speaking, perfect coincidence of the first and second renderings is possible only for virtual objects that conform to the display surface 18' of the external display screen (shown curved in FIG. 8, but may also be flat). Apparent coincidence is attainable, however, even for virtual objects that deviate from the display surface profile, provided the user is not too close to the display screen.

In some embodiments and scenarios, the second rendering may be displayed such that a projection 75 of the second rendering in the display surface coincides with the first rendering in the field of view of the user. Alternatively, the second rendering may be displayed such that a cross section of the second rendering in the display surface coincides with the first rendering in the field of view of the user. Here, display of the second rendering may impart depth to the virtual object as rendered in the first rendering.

Figure 9B:
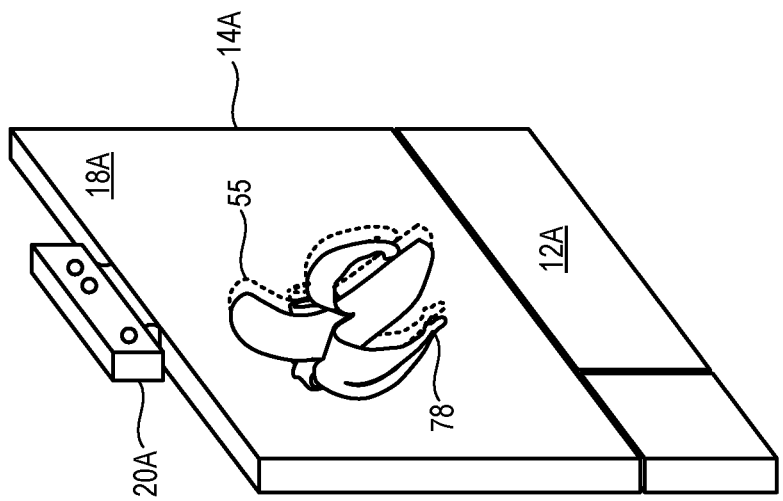
FIGS. 9A and 9B show example second renderings of a virtual object.
Figure 9A:
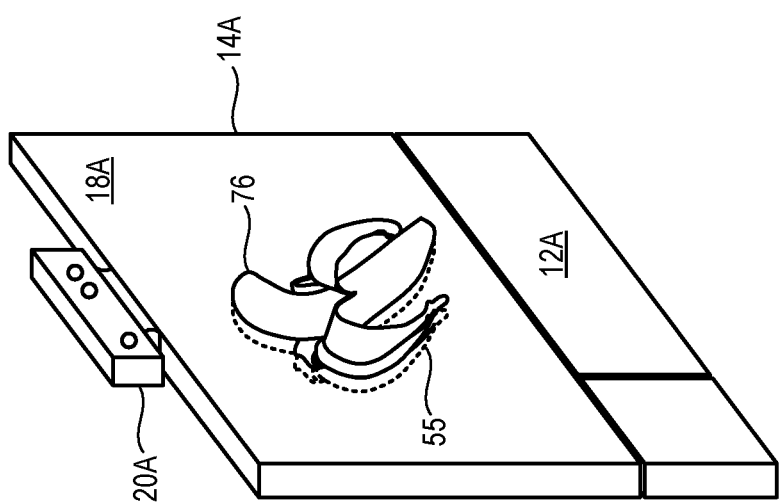

In some examples, the binocular disparity of the second rendering may be such as to make the virtual object appear to move or extend forward of the surface of the display screen. This variant is illustrated by way of example in second rendering 76 of FIG. 9A. Alternatively, the virtual object may appear to drop behind the display screen and into a virtual box located behind the display screen, as illustrated in second rendering 78 of FIG. 9B. The virtual box may include gridlines or other features to suggest perspective.

Returning again to FIG. 7, at 80 (which may occur before, during, or after 72), the first rendering of the virtual object is removed from the external display screen. In some embodiments, display of the second rendering and removal of the first rendering may be concurrent, or nearly so. In some embodiments, the first rendering is faded out as the second rendering is faded in. Redundant simultaneous rendering of the same virtual object on the near-eye display and the on the external display screen (i.e., overlapping first and second intervals) may be avoided in order to prevent the distracting visual effect caused by plural renderings aligned imperfectly in the user's field of view. Nevertheless, partial simultaneous rendering may be used in some scenarios—e.g., when a virtual object is moved laterally off the display screen and across a display-screen bezel (vide infra).

At this stage of method 56, the virtual object being displayed may be subject to the control of the user of the near-eye display device. At 82, accordingly, the size, position, orientation, shape, or surface attribute of the virtual object optionally may be changed pursuant to input from the user of the near-eye display device. Such input may take the form of a hand gesture to simulate grasping, turning, and/or stretching of the virtual object, dipping a finger into a paint pallet and touching to colorize and/or texturize the virtual object, etc. These actions alter the underlying virtual-object data, which, in turn, alters the second rendering provided on the near-eye display device. To facilitate gesture recognition, video of the user's hands may be acquired via a machine-vision system of the near-eye display system, of an external computer in computer system 10, or of any computer networked thereto, and analyzed in the near-eye display device or in any computer networked thereto.

During the second interval, when the virtual object is primarily displayed by a near-eye display device, other near-eye display-device users may also view the object. In this scenario, one near-eye display device may negotiate permission to share the virtual-object data, which references the size, position, and orientation of the virtual object to real-world or otherwise shared coordinates. Each near-eye display device in the computer system may then compose and display a second rendering of the virtual object appropriate for the position and orientation of that device relative to the virtual object. At this stage of the method, the virtual object may be 'handed off' from one near-eye display-device user to another such that different users may control display of the object.

After the virtual object has been viewed, experienced, and possibly manipulated by one or more near-eye display-device users, it may be returned to the external display screen from which it was taken, or transferred to a different external display screen of the computer system. This process requires the computer rendering to the object-receiving display screen to be aware of the position and orientation of the object-providing near-eye display device relative to that of the object-receiving display screen. At 84, therefore, display-device data is again sensed—i.e., updated—and at 86 the updated display-device data is sent to the computer. The display-device data may be sent from the near-eye display system or from a machine-vision system operatively coupled to the computer.

At 88 the near-eye display device sends, to the computer operatively coupled to the display screen, changed virtual-object data representing the virtual object as changed. In one embodiment, the changed virtual-object data may be sent automatically, pursuant to the near-eye display device relinquishing display of the virtual object to the computer operatively coupled to the display screen. In scenarios in which the virtual object was actually moved out of the confines of the external display screen, the changed virtual-object data may be sent pursuant to the virtual object being moved back onto the external display screen.

Receipt of the changed virtual-object data may trigger, at 90, display of a third rendering of the virtual object on the display screen, which coincides with the second rendering. In some non-limiting embodiments, the third rendering of the virtual object (like the first) may be a projection of the virtual object onto a flat or curved display surface of the display screen. At 92 the second rendering is removed from the near-eye display device. The discussion above, concerning the manner of transitioning from one rendering to another, applies here as well.

No aspect of method 56 should be interpreted in a limiting sense, for numerous variations, extensions, and omissions are envisaged. In embodiments featuring a plurality of near-eye display devices of a corresponding plurality of users, where each near-eye display device displays a different second rendering of the virtual object (consistent with a different location and orientation of each user perspective with respect to the display screen) the collective of near-eye display devices may negotiate an appropriate expansion space for the virtual object as it is lifted off of the display screen, so that each user (sighting the display screen from a different position) can view the virtual object at an appropriate position. The collective may block the display for users situated behind the display monitor, for instance.

In some embodiments, where the afore-mentioned display screen is one of a plurality of display screens external to the near-eye display device, each display screen being associated with a computer, the near-eye display device may be configured to, for each of the display screens: receive virtual-object data as in 60; receive display-device data as in 64; receive display-screen data as in 66; compose a second, 3D rendering of the virtual object as in 70; and display the second rendering binocularly as in 72.

Figure 10:
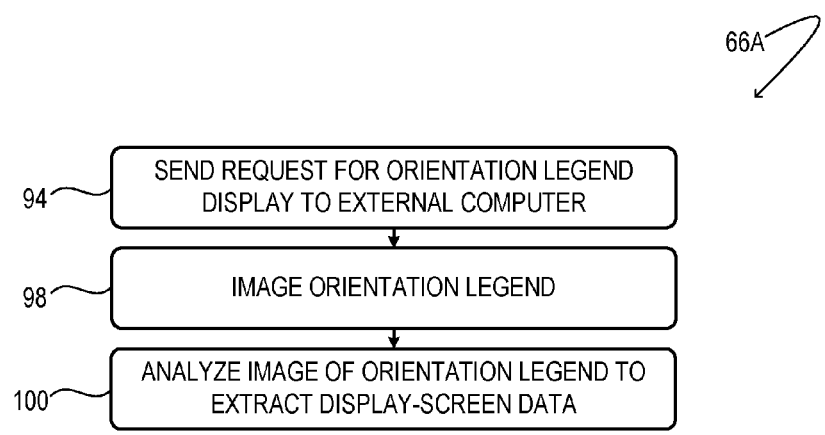
FIG. 10 illustrates an example method to sense display-screen data.

FIG. 10 illustrates an example method 66A to sense display-screen data. Method 66A may be incorporated into method 56, as a particular instance of step 66, or it may be used independently.

Figure 11:
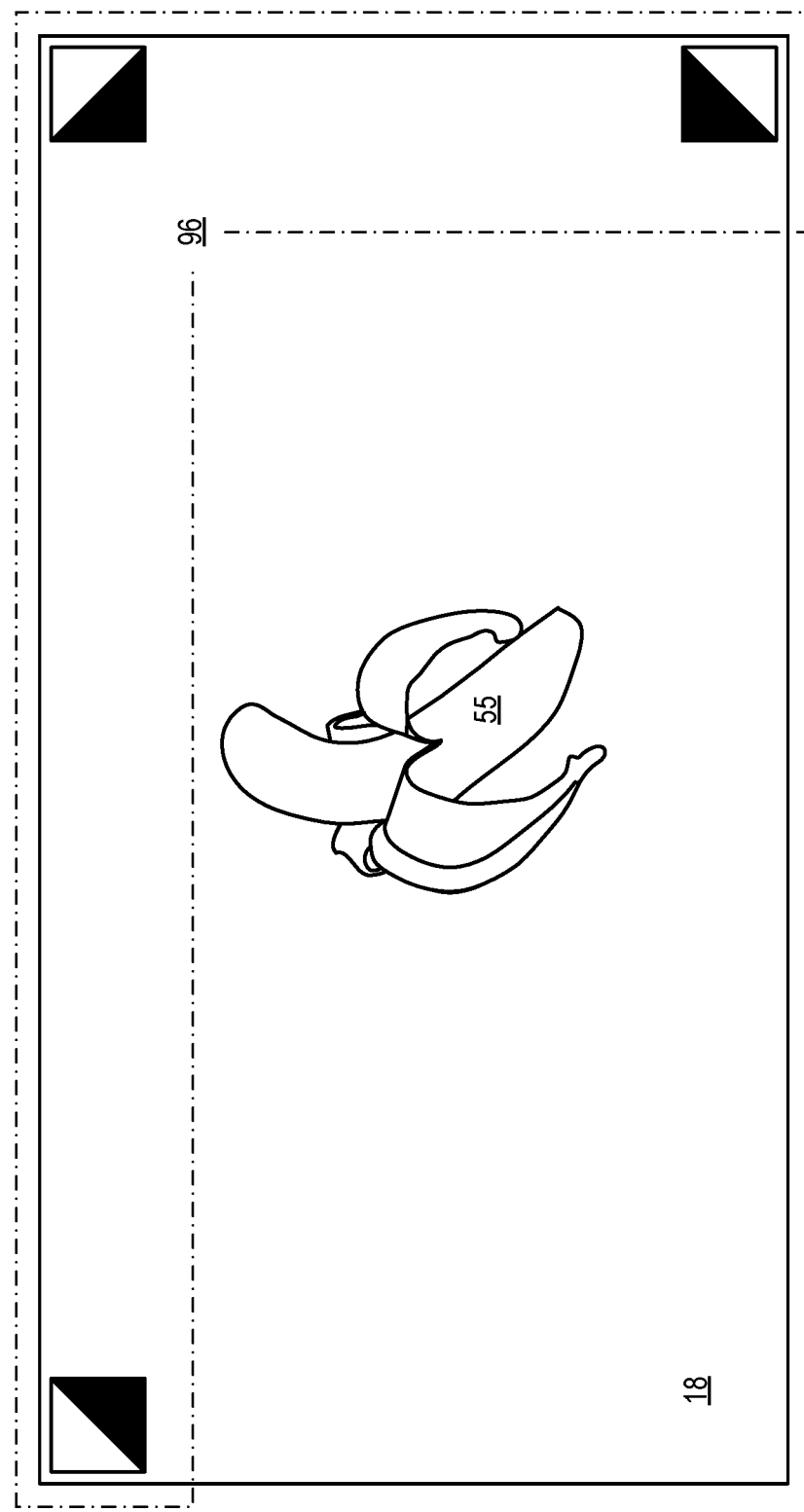
FIG. 11 shows an example orientation legend.

At 94 of method 66A, the near-eye display device sends a request to the computer operatively coupled to the display screen displaying the first rendering. The request is configured to cause the display screen to display an orientation legend. In some embodiments, the orientation legend includes a visible feature at one or more corners of the display screen. In general, the orientation legend should visually convey sufficient information to indicate the relevant parameters of the display screen, including position, size, and orientation. The orientation legend may be displayed persistently or transiently. FIG. 11 shows an example orientation legend 96 including three corner markers. In some embodiments, the request is sent automatically pursuant to input from the user to select or move the virtual object off of the display screen. The virtual object may be moved off the display-screen using a mouse, or a hand-tracking system attached to the stereoscopic near-eye display device. Moreover, the term 'off of the display screen' may refer to the result of sliding the object laterally off of the side of the display screen, or pulling the object outward in a direction normal or oblique to the display surface of the display screen.

Returning to FIG. 10, at 98 the machine-vision system of the near-eye display device images the orientation legend. At 100 the near-eye display device analyzes the resulting image of the orientation legend to extract display-screen data indicating a physical size, position, and orientation of the display screen. Method 66A may be repeated at any appropriate interval, as the user of the near-eye display device moves throughout the computer-system environment. In this manner, the near-eye display device can request recalibration of the physical size of the display screen, and of the position and orientation of the display screen relative to itself.

As noted above, the methods and processes described herein may be tied to a computer system of one or more computing devices. In particular, such methods and processes may be implemented as a computer-application program or service, an application-programming interface (API), a library, and/or other computer-program product.

FIG. 2 schematically shows a non-limiting embodiment of a computer system 10 that can enact the methods and processes described above. Computer system 10 includes a processor 24 and an electronic memory machine 26, for example. Computer system 10 includes a display subsystem, input subsystem, communication subsystem, and may include other components not shown in FIG. 2.

Processor 24 includes one or more physical devices configured to execute instructions. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Processor 24 may be one of a plurality of processors configured to execute software instructions. Additionally or alternatively, the processor may include one or more hardware or firmware logic machines configured to execute hardware or firmware instructions. Processors of computer system 10 may be single-core or multi-core, and the instructions executed thereon may be configured for sequential, parallel, and/or distributed processing. Individual components of the computer system optionally may be distributed among two or more separate devices, which may be remotely located and/or configured for coordinated processing. Aspects of the computer system may be virtualized and executed by remotely accessible, networked computing devices configured in a cloud-computing configuration.

Electronic memory machine 26 includes one or more physical devices configured to hold instructions executable by processor 24 to implement the methods and processes described herein. When such methods and processes are implemented, the state of electronic memory machine 26 may be transformed—e.g., to hold different data.

Electronic memory machine 26 may include removable and/or built-in devices. Electronic memory machine 26 may include semiconductor memory (e.g., RAM, EPROM, EPROM, etc.), and/or magnetic memory (e.g., hard-disk drive, floppy-disk drive, tape drive, MRAM, etc.), among others. Electronic memory machine 26 may include volatile, nonvolatile, dynamic, static, read/write, read-only, random-access, sequential-access, location-addressable, file-addressable, and/or content-addressable devices.

It will be appreciated that electronic memory machine 26 includes one or more physical devices. However, aspects of the instructions described herein alternatively may be propagated by a communication medium (e.g., an electromagnetic signal, an optical signal, etc.) that is not held by a physical device for a finite duration.

Aspects of processor 24 and electronic memory machine 26 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer system 10 implemented to perform a particular function. In some cases, a module, program, or engine may be instantiated via processor 24 executing instructions held by electronic memory machine 26. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

A display subsystem may be used to present a visual representation of data held by electronic memory machine 26. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more near-eye display devices utilizing virtually any type of technology. Such near-eye display devices may be combined with processor 24 and/or electronic memory machine 26 in a shared enclosure, or such near-eye display devices may be peripheral near-eye display devices.

An input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

A communication subsystem may be configured to communicatively couple computer system 10 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer system 10 to send and/or receive messages to and/or from other devices via a network such as the Internet.

One aspect of this disclosure is directed to a method to display a virtual object. The method is enacted in a computer system cooperating with at least one stereoscopic, near-eye display device and at least one external display screen viewable to a user of the near-eye display device. The method includes: receiving virtual-object data representing the virtual object, a first rendering of the virtual object being displayed on the display screen during a first interval; receiving display-screen data indicating a physical size, position, and orientation of the display screen; receiving display-device data indicating a position and orientation of the near-eye display device; composing a second, 3D rendering of the virtual object based on the virtual-object data and on the relative position and orientation of the display screen versus the near-eye display device, as indicated by the display-screen and display-device data; and displaying the second rendering binocularly on the near-eye display device during a subsequent second interval, such that the second rendering coincides with the first rendering in an augmented field of view of the user.

In some implementations, the method further comprises removing the first rendering concurrent with displaying the second rendering. In some implementations, the first rendering is faded out as the second rendering is faded in. In some implementations, the first rendering is a 2D projection of the virtual object onto a surface of the display screen, and the second rendering includes binocular disparity. In some implementations, the virtual object data is received from a computer operatively coupled to the display screen. In some implementations, the display-screen data is received from a machine-vision system of the near-eye display device. In some implementations, the method further comprises enacting object recognition on an image of the display screen acquired by the machine-vision system to determine the size, position, and orientation of the display screen. In some implementations, the method further comprises changing a size, position, orientation, shape, or surface attribute of the virtual object pursuant to input from the user. In some implementations, the method further comprises sending, to a computer operatively coupled to the display screen, changed virtual-object data representing the virtual object as changed, wherein receipt of the changed virtual-object data triggers display of a third rendering of the virtual object on the display screen. In some implementations, the changed virtual-object data is sent automatically, pursuant to the near-eye display device relinquishing display of the virtual object to the computer operatively coupled to the display screen. In some implementations, the third rendering of the virtual object is a projection of the virtual object onto a flat surface of the display screen. In some implementations, the method further comprises sensing the display-device data and sending the display-device data to a computer operatively coupled to the display screen. In some implementations, the display-device data is sensed by and sent by the near-eye display system. In some implementations, the display-device data is sensed by and sent by a machine-vision system operatively coupled to the computer.

Another aspect of this disclosure is directed to a computer system configured to display a virtual object, the computer system comprising: a stereoscopic, near-eye display device including a processor and associated electronic memory machine, the electronic memory machine holding instructions that cause the processor to: receive virtual-object data representing the virtual object, a first rendering of the virtual object being displayed on a display screen during a first interval, the display screen being external to the near-eye display device and viewable to a user of the near-eye display device; receive display-screen data indicating a physical size, position, and orientation of the display screen; receive display-device data indicating a position and orientation of the near-eye display device; compose a second, 3D rendering of the virtual object based on the virtual-object data and on the relative position and orientation of the display screen versus the near-eye display device, as indicated by the display-screen and display-device data; and display the second rendering binocularly on the near-eye display device during a subsequent second interval, such that the second rendering coincides with the first rendering in an augmented field of view of the user.

In some implementations, the near-eye display device is one of a plurality of near-eye display devices, wherein each near-eye display device displays a different second rendering of the virtual object, consistent with a different location and orientation of each near-eye display device. In some implementations, the display screen is one of a plurality of display screens external to the near-eye display device, wherein each display screen is associated with a computer, and wherein the near-eye display device is configured to, for each of the display screens, binocularly display a rendering of an object previously displayed by that display screen such that the rendering coincides with the object previously displayed.

Another aspect of this disclosure is directed to a method to display a virtual object. The method is enacted in a computer system cooperating with at least one stereoscopic, near-eye display device and at least one external display screen viewable to a user of the near-eye display device. The method includes: receiving virtual-object data representing the virtual object, a first rendering of the virtual object being displayed on the display screen during a first interval; sending a request to a computer operatively coupled to the display screen that causes the display screen to display an orientation legend; imaging the orientation legend in a machine-vision system of the near-eye display device; analyzing the orientation legend to extract display-screen data indicating a physical size, position, and orientation of the display screen; receiving display-device data indicating a position and orientation of the near-eye display device; composing a second, 3D rendering of the virtual object based on the virtual-object data and on the relative position and orientation of the display screen versus the near-eye display device, as indicated by the display-screen and display-device data; and displaying the second rendering binocularly on the near-eye display device during a subsequent second interval, such that the second rendering coincides with the first rendering in an augmented field of view of the user.

In some implementations, the orientation legend includes a visible feature at one or more corners of the display screen, to provide an indication of position, size, and orientation of the display screen. In some implementations, the request is sent automatically pursuant to input from the user to select or move the virtual object off of the display screen.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted in a computer system cooperating with at least one stereoscopic, near-eye display device and at least one external display screen viewable to a user of the near-eye display device, a method to display a virtual object, the method comprising:
receiving virtual-object data representing the virtual object, a first rendering of the virtual object being displayed on the display screen during a first interval;
receiving display-screen data indicating a physical size, position, and orientation of the display screen;
receiving display-device data indicating a position and orientation of the near-eye display device;
composing a second, 3D rendering of the virtual object based on the virtual-object data and on the relative position and orientation of the display screen versus the near-eye display device, as indicated by the display-screen and display-device data; and displaying the second rendering binocularly on the near-eye display device during a subsequent second interval, such that the second rendering coincides with the first rendering in an augmented field of view of the user.

2. The method of claim 1 further comprising removing the first rendering concurrent with displaying the second rendering.

3. The method of claim 2 wherein the first rendering is faded out as the second rendering is faded in.

4. The method of claim 1 wherein the first rendering is a 2D projection of the virtual object onto a surface of the display screen, and wherein the second rendering includes binocular disparity.

5. The method of claim 1 wherein the virtual object data is received from a computer operatively coupled to the display screen.

6. The method of claim 1 wherein the display-screen data is received from a machine-vision system of the near-eye display device.

7. The method of claim 6 further comprising enacting object recognition on an image of the display screen acquired by the machine-vision system to determine the size, position, and orientation of the display screen.

8. The method of claim 1 further comprising changing a size, position, orientation, shape, or surface attribute of the virtual object pursuant to input from the user.

9. The method of claim 8 further comprising sending, to a computer operatively coupled to the display screen, changed virtual-object data representing the virtual object as changed, wherein receipt of the changed virtual-object data triggers display of a third rendering of the virtual object on the display screen.

10. The method of claim 9 wherein the changed virtual-object data is sent automatically, pursuant to the near-eye display device relinquishing display of the virtual object to the computer operatively coupled to the display screen.

11. The method of claim 9 wherein the third rendering of the virtual object is a projection of the virtual object onto a flat surface of the display screen.

12. The method of claim 1 further comprising sensing the display-device data and sending the display-device data to a computer operatively coupled to the display screen.

13. The method of claim 12 wherein the display-device data is sensed by and sent by the near-eye display system.

14. The method of claim 12 wherein the display-device data is sensed by and sent by a machine-vision system operatively coupled to the computer.

15. A computer system configured to display a virtual object, the computer system comprising:

a stereoscopic, near-eye display device including a processor and associated electronic memory machine, the electronic memory machine holding instructions that cause the processor to:

receive virtual-object data representing the virtual object, a first rendering of the virtual object being displayed on a display screen during a first interval, the display screen being external to the near-eye display device and viewable to a user of the near-eye display device;

receive display-screen data indicating a physical size, position, and orientation of the display screen;

receive display-device data indicating a position and orientation of the near-eye display device;

compose a second, 3D rendering of the virtual object based on the virtual-object data and on the relative position and orientation of the display screen versus the near-eye display device, as indicated by the display-screen and display-device data; and display the second rendering binocularly on the near-eye display device during a subsequent second interval, such that the second rendering coincides with the first rendering in an augmented field of view of the user.

16. The computer system of claim 15 wherein the near-eye display device is one of a plurality of near-eye display devices, wherein each near-eye display device displays a different second rendering of the virtual object, consistent with a different location and orientation of each near-eye display device.

17. The computer system of claim 15 wherein the display screen is one of a plurality of display screens external to the near-eye display device, wherein each display screen is associated with a computer, and wherein the near-eye display device is configured to, for each of the display screens, binocularly display a rendering of an object previously displayed by that display screen such that the rendering coincides with the object previously displayed.

18. Enacted in a computer system cooperating with at least one stereoscopic, near-eye display device and at least one external display screen viewable to a user of the near-eye display device, a method to display a virtual object, the method comprising:

receiving virtual-object data representing the virtual object, a first rendering of the virtual object being displayed on the display screen during a first interval;

sending a request to a computer operatively coupled to the display screen that causes the display screen to display an orientation legend;

imaging the orientation legend in a machine-vision system of the near-eye display device;

analyzing the orientation legend to extract display-screen data indicating a physical size, position, and orientation of the display screen;

receiving display-device data indicating a position and orientation of the near-eye display device;

composing a second, 3D rendering of the virtual object based on the virtual-object data and on the relative position and orientation of the display screen versus the near-eye display device, as indicated by the display-screen and display-device data; and displaying the second rendering binocularly on the near-eye display device during a subsequent second interval, such that the second rendering coincides with the first rendering in an augmented field of view of the user.

19. The method of claim 18 wherein the orientation legend includes a visible feature at one or more corners of the display screen, to provide an indication of position, size, and orientation of the display screen.

20. The method of claim 18 wherein the request is sent automatically pursuant to input from the user to select or move the virtual object off of the display screen.

* * * * *